United States Patent [19]

Weltin et al.

[11] Patent Number: 5,346,192
[45] Date of Patent: Sep. 13, 1994

[54] HYDRAULIC BEARING WITH ELECTROMAGNETICALLY COMPENSATED CHAMBERS

[75] Inventors: Uwe Weltin, Rimbach; Ulrich Freudenberg, Hirschberg; Tillman Freudenberg, Fürth/Steinbach, all of Fed. Rep. of Germany

[73] Assignee: Firma Carl Freudenberg, Weinheim, Fed. Rep. of Germany

[21] Appl. No.: 14,964

[22] Filed: Feb. 8, 1993

[30] Foreign Application Priority Data

Feb. 12, 1992 [DE] Fed. Rep. of Germany ....... 4204070

[51] Int. Cl.$^5$ ............................................. F16F 15/03
[52] U.S. Cl. ................................. 267/140.14; 188/267
[58] Field of Search ................... 188/267; 267/140.14, 267/140.15; 248/550, 562, 638

[56] References Cited

U.S. PATENT DOCUMENTS

| | | | |
|---|---|---|---|
| 4,650,170 | 3/1987 | Fukushima | 267/140.14 |
| 4,693,455 | 9/1987 | Andra | 267/140.14 |
| 4,762,306 | 8/1988 | Watanabe et al. | 267/140.14 |
| 4,793,599 | 12/1988 | Ishioka | 267/140.14 |
| 4,872,652 | 10/1989 | Rohner et al. | 267/140.14 |
| 4,899,996 | 2/1390 | Maassen et al. | |
| 5,042,786 | 8/1991 | Freudenberg et al. | 267/140.14 |
| 5,238,232 | 8/1993 | Kobayashi et al. | 267/140.14 |

FOREIGN PATENT DOCUMENTS

| | | | |
|---|---|---|---|
| 0440536 | 8/1991 | European Pat. Off. | 267/140.14 |
| 3423698 | 1/1985 | Fed. Rep. of Germany | |
| 65928 | 4/1985 | Japan | |
| 234143 | 11/1985 | Japan | |

*Primary Examiner*—Matthew C. Graham
*Attorney, Agent, or Firm*—Kenyon & Kenyon

[57] ABSTRACT

A rubber bearing, in which a liquid-filled working chamber is bounded by an expanding member and by a compensating wall that is capable of moving back and forth in the direction of the working chamber, wherein the compensating wall consists at least partially of a material that is capable of being moved by magnetic forces and extends relatively movably with one partial area into an air gap between a pair of coils comprised of two mutually opposing magnetic coils, which are rigidly supported in two coil braces and are capable of receiving an electric alternating current. The magnetic fluxes of the magnetic coils in the air gap are superimposed upon the magnetic flux of at least one permanent magnet, and the magnetic coils synchronously receive an electric current in such a way that the magnetic flux generated by the permanent magnet is strengthened on one side of the compensating wall and weakened on the other side of the compensating wall.

20 Claims, 3 Drawing Sheets

HYDRAULIC BEARING WITH ELECTROMAGNETICALLY COMPENSATED CHAMBERS

BACKGROUND OF THE INVENTION

The invention relates to rubber bearings, and, more particularly, to a rubber bearing in which a liquid-filled working chamber is bounded at least by a resilient expanding member and by a compensating wall that is capable of moving back and forth in the direction of the working chamber. The compensating wall consists at least partially of a material that is capable of being moved by magnetic forces. One partial area of the compensating wall extends into an air gap between mutually opposing magnetic coils, which are rigidly supported in coil braces and are capable of receiving an electric alternating current.

The German Published Patent Application DE-OS 34 23 698 discloses a rubber bearing using a fluid chamber. This rubber bearing is also described in U.S. Pat. No. 4,650,170 to Fukushima, the disclosure of which is hereby incorporated by reference into the present specification. Pulsating pressure fluctuations are generated in the fluid contained in the fluid chamber of that bearing by a vibrational element activated by magnetic coils. If movement of the vibrational element is modulated in relation to vibrations introduced from the outside, then transmission of vibrations is reduced.

In the bearing described in DE-OS 34 23 698 and U.S. Pat. No. 4,650,170, the magnetic coils must be alternately triggered to isolate vibrations, since the coils can generate only attractive forces. Further, the attractive forces on the vibrational element are proportional to the square of the coil current, requiring special equalization measures to achieve a sinusoidal response. Moreover, because the forces vary significantly with the gap width, the system reacts quite sensitively to mechanical tolerance errors. Additionally, no precautions have been taken to retain the compensating wall in a neutral position symmetrically between the magnetic coils.

SUMMARY OF THE INVENTION

An object of the present invention is to achieve improved vibration isolation of acoustically disturbing vibrations by providing a rubber bearing having a comparatively simple design which can be operated by a simple triggering of magnetic coils.

Another object of the present invention is to provide a rubber bearing with improved linearity properties, so that the response to a sinusoidal current signal will likewise be a sinusoidal, only slightly distorted force signal.

Another object of the present invention is to provide a rubber bearing in which mechanical tolerances bear considerably less influence on the working properties of the bearing.

Another object of the present invention is to provide a rubber bearing which can be manufactured economically.

The invention achieves these objectives by providing a rubber bearing in which a liquid-filled working chamber is bounded by an expanding member and by a compensating wall that is capable of moving back and forth in the direction of the working chamber, wherein the compensating wall consists at least partially of a material that is capable of being moved by magnetic forces and extends relatively movably with one partial area into an air gap between a pair of coils comprised of two mutually opposing magnetic coils, which are rigidly supported in two coil braces and are capable of receiving an electric alternating current. The magnetic fluxes of the magnetic coils in the air gap are superimposed upon the magnetic flux of at least one permanent magnet, and the magnetic coils synchronously receive an electric current in such a way that the magnetic flux generated by the permanent magnet is strengthened on one side of the compensating wall and weakened on the other side of the compensating wall.

DETAILED DESCRIPTION

Figure 1:
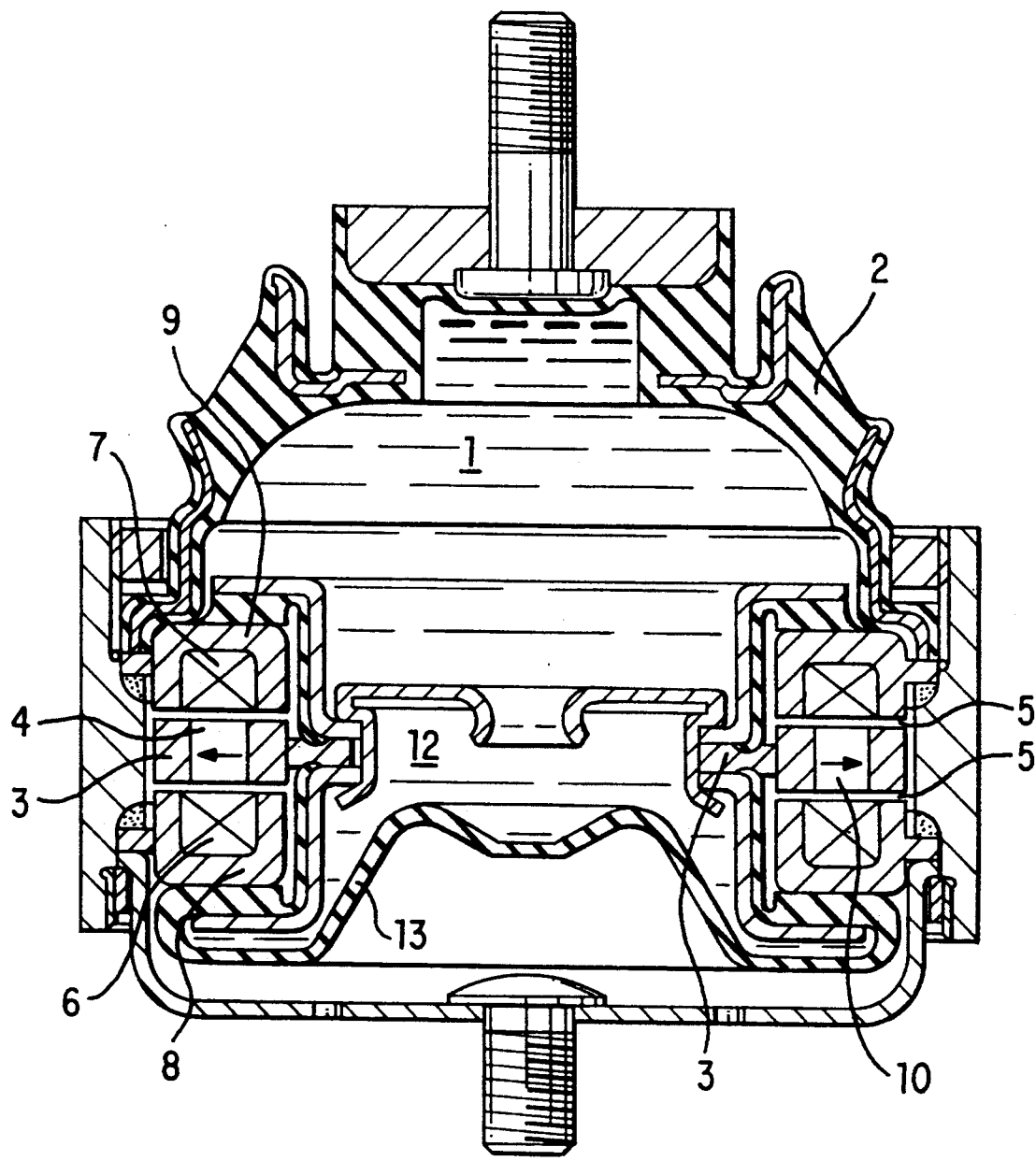
FIG. 1 shows an embodiment of a rubber bearing constructed in accordance with the present invention in longitudinal cross section.

FIG. 1 depicts a rubber bearing constructed according to the invention containing a liquid-filled working chamber 1, which is bounded in the axial direction on one side by a rubber elastic expanding member 2 and, on the other side, by a compensating wall 3 that is capable of moving back and forth in the axial direction. The compensating wall 3 has an opening in its central area for fluid communication between the working chamber 1 and a compensating chamber 12. In one partial area 4, the compensating wall 3 consists of a material that is capable of being moved by magnetic forces. The partial area 4 is arranged so that it is axially movable in an air gap 5 between two magnetic coils 6, 7 that oppose one another axially. The magnetic coils 6, 7 are rigidly supported in each case in a coil brace 8, 9 and are capable of receiving an a.c. current. A permanent magnet 10 is embedded within the partial area 4 of the compensating wall 3 and is magnetized in the radial direction, as shown by the arrows in FIG. 1. The partial area 4, the magnetic coils 6, 7, and the air gap 5 are sealed off from the liquid contained inside the bearing.

The compensating chamber 12 is configured on the side of the compensating wall 3 facing away from the working chamber 1 and receives the liquid volume that is displaced out of the working chamber 1 through the opening in the compensating wall 3. It will be appreciated that the fluid is displaced in a nearly nonpressurized manner when the rubber bearing experiences deflection. The compensating chamber 12 is bounded by a rolling-diaphragm-type boundary wall 13 which consists of an elastomeric material. As shown in FIG. 1, boundary wall 13 may be formed integrally with a resilient member which holds the compensating wall 3 in a central position between the magnetic coils 6, 7.

The magnetic coils 6, 7 and the permanent magnet 10 are arranged so that the magnetic fluxes of the magnetic coils 6, 7 are superimposed upon the magnetic flux of the permanent magnet 10. Due to the arrangement of the magnetic coils 6, 7, the magnetic flux produced by the permanent magnet 10 is strengthened on one side of the compensating wall 3 and simultaneously weakened to the same extent on the other side.

Figure 2:
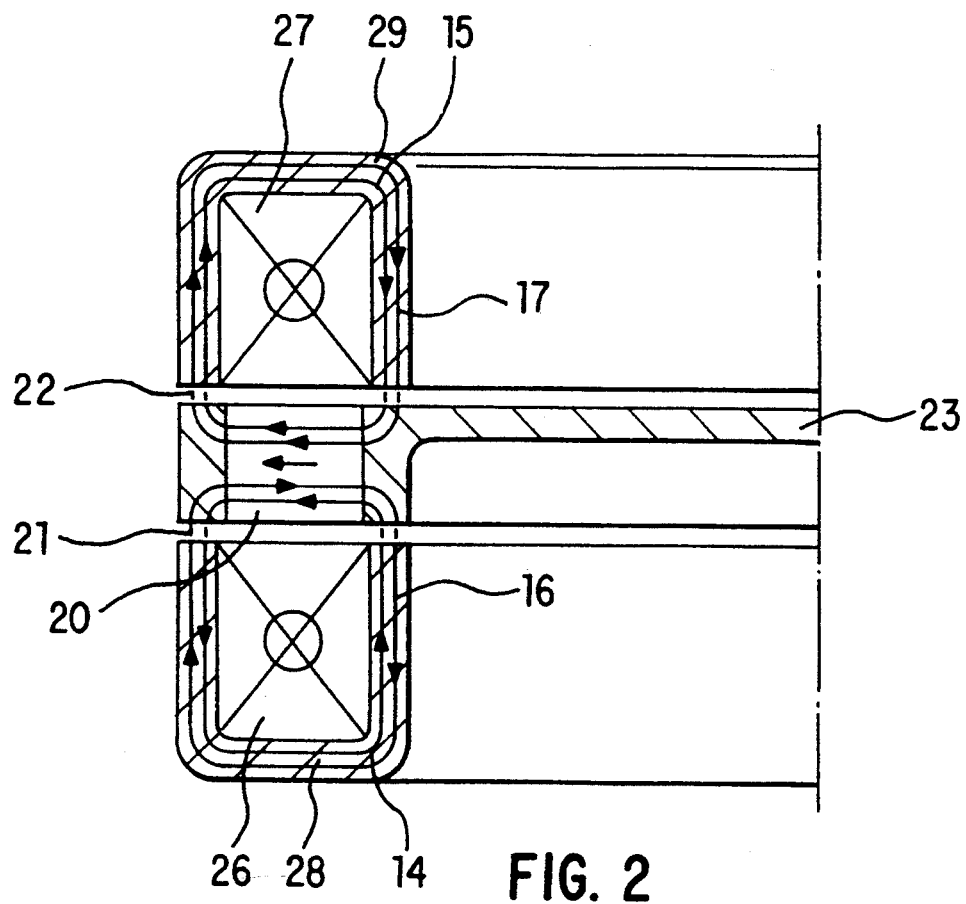
FIG. 2 shows an embodiment of a magnetic vibrational structure constructed in accordance with the present invention.

This relationship may be more fully understood with reference to FIG. 2. Magnetic coils 26, 27 are arranged on mutually opposing sides of compensating wall 23. Each is partially surrounded by a magnetic coil brace 28, 29. Each magnetic coil 26, 27 is arranged in a slot of the respective coil brace 28, 29 that is open in the direction of the compensating wall 23. Permanent magnet 20 is located within compensating wall 23. To direct the magnetic flux into the air gap, magnetic flux concentrating pieces are arranged in the radial direction inside and outside of the permanent magnet 20 and are integrally formed with the compensating wall 23.

The compensating wall 23 is situated in a central position in the air gap. As a result, the widths of gaps 21 and 22 are essentially the same. Because of this "magnetic symmetry", the magnetic flux $\Phi_p$ of the permanent magnet 20 is divided into two equal partial fluxes $0.5\Phi_p$, which are directed into the gaps 21 and 22. The magnetic partial fluxes of $0.5 \Phi_p$ each are designated by reference numerals 14 and 15 in FIG. 2.

Alternating current traverses the magnetic coils 26, 27 in the same sense of rotation around their respective slots. The current in each coil is the same, to achieve equal magnetic fluxes $\Phi_s$. In this exemplified embodiment, the magnetic coils 26, 27 have the same dimensions and the same number of turns and are connected in series to one another. Thus, the current can be synchronously controlled, and symmetry of force can be achieved. The alternating magnetic fluxes $\Phi_s$ produced by the magnetic coils 26, 27 are denoted by the reference symbols 16 and 17.

The alternating magnetic fluxes 16, 17 are superimposed upon the permanent magnetic partial fluxes 14, 15. As shown in FIG. 2, a strengthening of the magnetic flux results in this manner in gap 22, while a weakening of the magnetic flux results in gap 21.

This described configuration achieves particularly good linearity between the current in the magnetic coils and the force on the compensating wall, so that signal shaping measures are not needed. To illustrate this principle, it is helpful to describe the action of force on the compensating wall in simplified mathematical terms. For this purpose, it is assumed that the compensating wall is fixed in its middle position and that the magnetic fields in the air gaps are homogeneous. The net force K on the compensating wall results as the difference between two attractive forces $K_1$ and $K_2$. These attractive forces are proportional to the square of the particular total flux on each side, which, in turn, is composed of the permanent and the alternating component:

$$K_1 = c^* \Phi_1{}^2 = c^*(0.5 \ \Phi_p + \Phi_s)^2$$

$$K_2 = c^* \Phi_2{}^2 = c^*(0.5 \ \Phi_p - \Phi_s)^2$$

The constant c depends essentially on the form and the spatial arrangement of the coil pair and the permanent magnet, and on how these component parts are arranged in relation to one another. These factors are the same on both sides of the compensating wall.

The net force K is the difference between the attractive forces $K_1$ and $K_2$ acting on the opposite sides of the compensating wall:

$$K = K_1 - K_2$$

The net force K is therefore:

$$K = c^* \Phi_p{}^* \Phi_s.$$

From this, it becomes clear that the net force K is directly proportional to the alternating flux and thus directly proportional to the current in the coils.

It will be appreciated that when the compensating wall is deflected out of its central position, the non-linear force components no longer fully cancel. However the linearity requirements can be achieved in a sufficiently large amplitude range by appropriately selecting the geometric relationships of the components.

The principle of the invention can also be achieved using direct current coils instead of the permanent magnet. However, the coils must be connected to a direct current source, which requires a considerable expenditure for construction and additional parts in the bearing as well as in the peripheral equipment. An advantage of the present invention is the low expenditure for electrical cabling.

Figure 3:
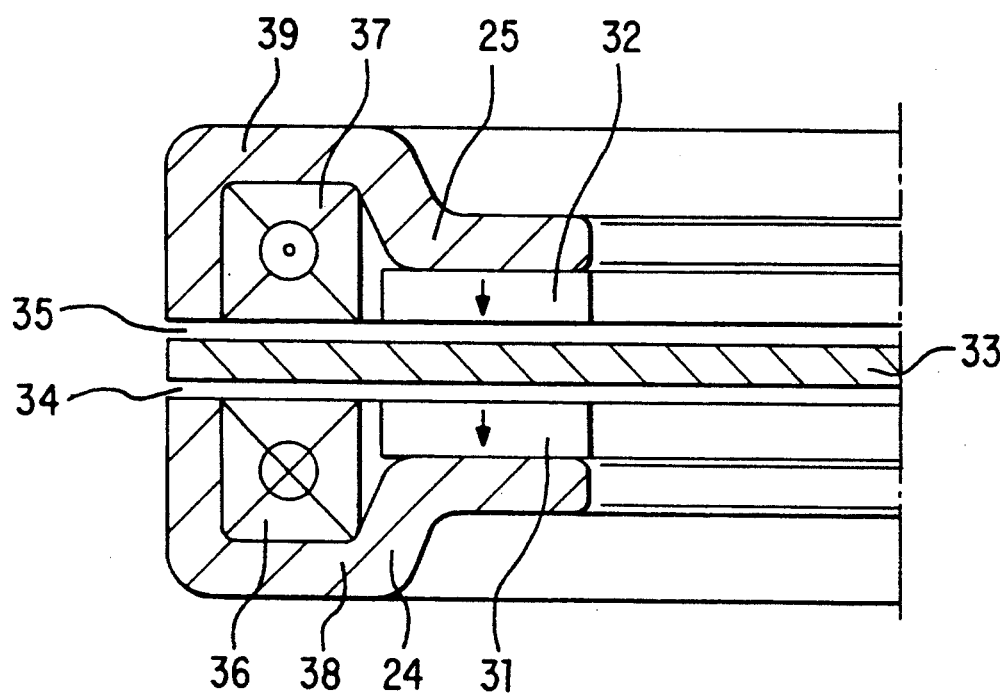
FIG. 3 shows another embodiment of a magnetic vibrational structure constructed in accordance with the present invention.
Figure 4:
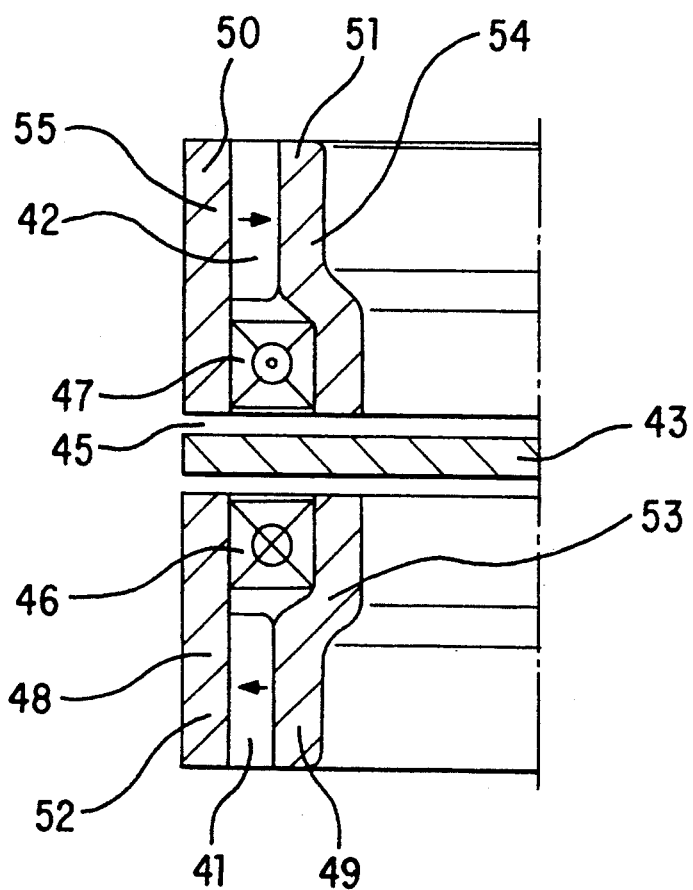
FIG. 4 shows another embodiment of a magnetic vibrational structure constructed in accordance with the present invention.
Figure 5:
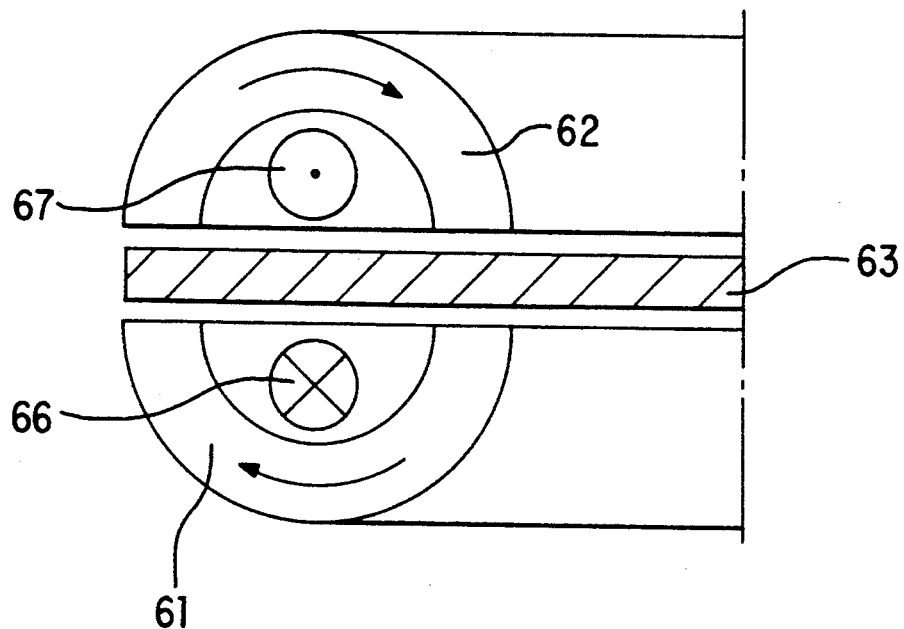
FIG. 5 shows another embodiment of a magnetic vibrational structure constructed in accordance with the present invention.

In FIGS. 3 through 5, magnetic vibrational structures are shown, each having two partial permanent magnets built into coil braces on opposing sides of a compensating wall. Because of the increased use of permanent magnets, these embodiments produce more force without increasing the inertial mass of the compensating wall. The desired force acting on the compensating wall can be achieved by using a weaker and less expensive magnetic material.

The embodiment of FIG. 3 is provided for applications in which the overall construction space is restricted in the axial direction, and not so restricted in the radial direction. Partial magnets 31, 32 are arranged within coil braces 38, 39 and are magnetized in the same axial direction, as shown by the arrows in FIG. 3. Magnetic coils 36, 37 are also arranged in coil braces 38, 39 and carry current in opposite directions. Each coil brace has a magnetically attracted part 24, 25. The design entails relatively few parts and is advantageous from both an economic as well as a production standpoint.

If, given substantially the same dimensions, a different flux concentration is required at the air gap in order to achieve a different force acting on the compensating wall 33, an additional part of magnetic material may be inserted between the partial magnets 31, 32 and the respective gap 34, 35. Depending on available space, radially or axially magnetized magnetic rings may be employed.

Another configuration comprising magnetic coils 46, 47 partial magnets 41, 42 and coil braces 48, 49, 50, 51 is shown in FIG. 4. With this configuration it is possible to construct a rubber bearing with small dimensions in the radial direction. The permanent partial magnets 41, 42 are arranged near the magnetic coils 46, 47 with clearance in the axial direction and are retained by the coil braces 48, 49, 50, 51 designed with magnetic parts 52, 53, 54, 55. This configuration exhibits an elevated flux concentration at the air gap 45 and, as a result, produces a greater force acting on the compensating wall 43.

FIG. 5 depicts a further embodiment, in which the partial magnets 61, 62 are not accompanied by magnetic flux concentrating pieces as in the previous embodiments. The magnetic coils 66, 67 on opposite sides of compensating wall 63 in this embodiment are not surrounded by coil braces of magnetic material; rather the coil braces are made of the permanent partial magnets 61, 62 having a curved cross section. The permanent partial magnets 61, 62 are magnetized in a curved form as shown by arrows in accordance with their shape. The magnetic coils 66, 67 are traversed by current in opposite directions. The magnetic material of the permanent partial magnets 61, 62 can be comprised, for example, of plastic-bonded magnets. Their advantage is that they can be easily manufactured in an injection molding process.

In the configurations depicted in FIGS. 3 through 5, the permanent partial magnets are arranged so as to allow the direction of the permanent-magnetic flux to cross the compensating wall perpendicularly to the gap plane. The advantage of this is that the material cross-section of the compensating wall can be low, since no permanent-magnetic flux has to be directed in the direction of the gap. As opposed to the magnetic arrangement shown in FIG. 2, however, the current in the magnetic coils of FIGS. 3 through 5 must flow in opposite directions on either side of the compensating wall to achieve the desired force response.

What is claimed:

1. A rubber bearing comprising:
   a liquid-filled working chamber bounded by a compensating wall comprised at least partially of a material that is capable of being moved by magnetic forces and capable of moving back and forth in the direction of said working chamber;
   a first magnetic coil and a second magnetic coil, each of which is capable of receiving an electric alternating current, wherein the first magnetic coil is oriented to generate a first alternating magnetic flux and the second magnetic coil is oriented to generate a second alternating magnetic flux; and
   a permanent magnet arrangement, comprising at least one permanent magnet, generating a permanent magnet magnetic flux, whereby said permanent magnet arrangement is oriented so that the first alternating magnetic flux strengthens the permanent magnet magnetic flux on one side of said compensating wall and the second alternating magnetic flux weakens the permanent magnet magnetic flux on an opposite side of said compensating wall.

2. The rubber bearing according to claim 1, wherein said liquid-filled working chamber is also bounded by a resilient expanding member.

3. The rubber bearing according to claim 2, wherein each of said first and second magnetic coils is rigidly supported in a coil brace.

4. The rubber bearing according to claim 3, wherein said permanent magnet arrangement comprises at least one partial magnet which is embedded in said compensating wall.

5. The rubber bearing according to claim 3, wherein said permanent magnet arrangement is comprised of two partial magnets each of which is combined with one of said first and second magnetic coils to make up a unit.

6. The rubber bearing according to claim 2, wherein said permanent magnet arrangement comprises at least one partial magnet which is embedded in said compensating wall.

7. The rubber bearing according to claim 2, wherein said permanent magnet arrangement is comprised of two partial magnets each of which is combined with one of said first and second magnetic coils to make up a unit.

8. The rubber bearing according to claim 7, wherein each of said units further comprises a coil brace for supporting said partial magnet and said magnetic coil.

9. The rubber bearing according to claim 8, wherein each of said coil braces comprises a magnetically attracted part.

10. The rubber bearing according to claim 7, wherein each of said partial magnets has a curved shape and supports one of said first and second magnetic coils.

11. The rubber bearing according to claim 2, wherein said compensating wall further comprises an annual partial area around its periphery which extends between said first and second magnetic coils.

12. The rubber bearing according to claim 1, wherein each of said first and second magnetic coils is rigidly supported in a coil brace.

13. The rubber bearing according to claim 12, wherein said permanent magnet arrangement comprises at least one partial magnet which is embedded in said compensating wall.

14. The rubber bearing according to claim 12, wherein said permanent magnet arrangement is comprised of two partial magnets each of which is combined with one of said first and second magnetic coils to make up a unit.

15. The rubber bearing according to claim 1, wherein said permanent magnet arrangement comprises at least one partial magnet which is embedded in said compensating wall.

16. The rubber bearing according to claim 1, wherein said permanent magnet arrangement is comprised of two partial magnets each of which is combined with one of said first and second magnetic coils to make up a unit.

17. The rubber bearing according to claim 16, wherein each of said units further comprises a coil brace for supporting said partial magnet and said magnetic coil.

18. The rubber bearing according to claim 17, wherein each of said coil braces comprises a magnetically attracted part.

19. The rubber bearing according to claim 16, wherein each of said partial magnets has a curved shape and supports one of said first and second magnetic coils.

20. The rubber bearing according to claim 1, wherein said compensating wall further comprises an annual partial area around its periphery which extends between said first and second magnetic coils.

* * * * *